United States Patent Office 3,294,810
Patented Dec. 27, 1966

3,294,810
BENZOFURO[2,3-c]PYRIDINES AND INTERMEDIATES
Arnold Brossi and Emilio Kyburz, Riehen, Switzerland, assignors to Hoffmann-La Roche Inc., Nutley, N.J., a corporation of New Jersey
No Drawing. Filed Nov. 13, 1962, Ser. No. 237,360
Claims priority, application Switzerland, Nov. 27, 1961, 13,790/61
9 Claims. (Cl. 260—297)

This invention relates to novel therapeutically valuable tricyclic compounds, as well as methods for their preparation and intermediates therefor. More particularly, the novel tricyclic compounds of this invention are selected from the group consisting of compounds of the formula

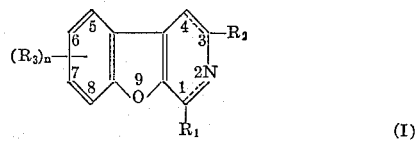

(I)

1,2,3,4-tetrahydro-N-alkyl derivatives thereof and acid addition salts thereof, wherein $R_1$ and $R_2$ are each selected from the group consisting of hydrogen and lower alkyl, $R_3$ is selected from the group consisting of hydroxy, lower alkoxy, lower alkyl, nitro, halogen and trifluoromethyl and $n$ is a whole integer from 0 to 3. In the case where $n$ is greater than 1, the substituents $R_3$ can be the same or different. The bonds represented as dotted can be partially or completely hydrogenated.

As used herein the term "lower alkyl" refers to straight or branched chain hydrocarbon groups such as methyl, ethyl, isopropyl, butyl, hexyl, and the like. Particularly preferred are those compounds of Formula I wherein $R_1$ is lower alkyl. The term halogen comprehends all four halogens, i.e. fluorine, chlorine, bromine and iodine. The term lower alkoxy is comprehensive of groups such as methoxy, ethoxy, butoxy and the like.

The compounds of Formula I above can be prepared by a variety of methods.

In one embodiment of the invention compounds of Formula I are prepared by reacting an amine of the formula

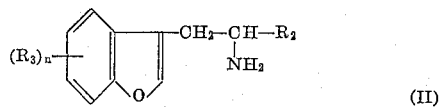

(II)

wherein $R_2$, $R_3$ and $n$ have the same meaning as above, with a carbonyl compound of the formula $$R_1—X \qquad (III)$$

wherein $R_1$ has the same meaning as above and $X$ is selected from the group consisting of carboxy, formyl and activated carboxyl;

cyclizing the reaction product so-obtained and, if desired, either hydrogenating or dehydrogenating and/or alkylating the so-obtained cyclization product; which, if desired, can also be nitrated and/or converted into a salt.

The starting materials of Formula II are substituted or unsubstituted 3-(β-aminoethyl)-benzofurans. These compounds belong to a known class of substances. Representative members thereof can be prepared by condensing a suitably substituted or unsubstituted 2,3-dihydro-3-benzofuranone with cyanoacetic acid, and subsequently reducing the cyano group of the condensation product to an aminomethyl group.

In the first step of a method of this invention, the amine of Formula II is reacted with a carbonyl compound of Formula III.

When X in Formula III represents a carboxy group or an activated carboxy group, there is obtained as the reaction product an N-acyl compound. For the acylation there is advantageously used as the compound of Formula III, an anhydride of a carboxylic acid of the formula $R_1$—COOH such as acetic anhydride, propionic anhydride, or the mixed anhydride obtained from the reaction of acetic anhydride and formic acid, in case the introduction of a formyl group is desired. It is suitable to conduct the acylation in the presence of an organic base, such as pyridine. The reaction proceeds at room temperature or at moderately elevated temperatures. An advantageous means of conducting the acylation consists of adding the amine of Formula II to a mixture of approximately equal volumes of pyridine and a carboxylic acid anhydride of Formula III at a temperature of up to about 70° C. and permitting the so-formed reaction solution to stand for several hours.

Besides those mentioned above, other activated carboxy group containing compounds of Formula III can be successfully utilized as acylating agents, for example, carbonyl halides such as acetyl chloride and propionyl chloride.

In the second step of the method, the N-acyl compound obtained in the first step is cyclized to a tricyclic compound of the formula

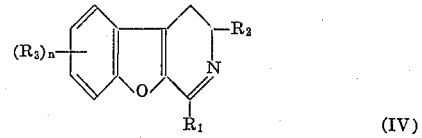

(IV)

wherein $R_1$, $R_2$, $R_3$ and $n$ have the same meaning as above.

Exemplary of compounds of Formula IV is 3,4-dihydro-benzofuro-[2,3-c]pyridine. This compound can be substituted in the 1- and/or 3-position by a lower alkyl group or in the benzene nucleus by one or more radicals represented by $R_3$.

The cyclization can be effected according to methods known per se. One such method consists of subjecting the intermediate acyl derivative to the presence of a mineral acid, for example, concentrated sulfuric acid, polyphosphoric acid or the like, or a phosphorus-containing cyclizing agent, such as a phosphorous oxyhalide, for example, phosphorous oxychloride, or phosphorous pentoxide. Advantageously, the reaction is effected in an inert solvent, for example, benzene, toluene, chloroform, methylene chloride or the like, and is effected at an elevated temperature. One suitable embodiment consists of heating the acid amide with phosphorous oxychloride in benzene for several hours under reflux.

The 3,4-dihydro compounds of Formula IV obtained by the above-described cyclization can be hydrogenated to the corresponding 1,2,3,4-tetrahydro compounds. The reduction can be effected with catalytically activated hydrogen in the presence of a hydrogenation catalyst such as platinum oxide, palladium, Raney-nickel or the like. Alternatively, the reduction can be conducted by the use of a chemical reducing agent such as an alkali metal hydride, for example, sodium borohydride, lithium aluminum hydride, or the like, the former advantageously being used when nitro groups have to remain intact.

The 1,2,3,4-tetrahydro compounds can also be obtained by reaction of an amine of Formula II with an aliphatic aldehyde of Formula III followed by cyclization of the reaction product. When the reaction is conducted in a suitable medium, for example, in the presence of a mineral acid, it is possible to directly obtain the tricyclic 1,2,3,4-tetrahydro compound without isolation of the intermediate product.

In a further reaction step the secondary amino group of the 1,2,3,4-tetrahydro compound can be alkylated. The alkylation can be conducted according to methods known per se. Thus, the N-methyl derivative can be prepared by treatment with formaldehyde and subsequent chemical (for example, with formic acid) or catalytic reduction. A further alkylation method consists in first acylating the amino group, for example, acetylating; then reducing the acyl group with a suitable reduction agent such as lithium aluminum hydride. Thus, for example, via the reduction of the acetyl group, there is obtained an N-ethyl derivative. These exemplify preferred N-lower alkyl groups.

The same N-alkyl compounds can also be obtained by quaternizing the dihydro derivative of Formula IV, for example, with alkyl iodides or dialkyl sulfates, and reducing the so-obtained quaternary ammonium compound, suitably with catalytically activated hydrogen. According to another embodiment of the invention, the partially hydrogenated cyclization products can be dehydrogenated to the corresponding benzofuro[2,3-c]pyridines. For example, the dehydrogenation can suitably be effected in the presence of a dehydrogenation catalyst at a temperature of between about 100° C. and about 300° C. Such catalysts are, for example, palladium-black, palladium carbon (in a solution such as Tetralin, or methylnaphthalene) or Raney-nickel, which beforehand is decocted in a high boiling solvent.

Tricyclic compounds of Formula I, wherein $R_3$ represents an hydroxy group, can also be prepared from the corresponding $R_3$=alkoxy-substituted tricyclic compounds of Formula I via hydrolysis. This can be effected, for example, via treatment of the alkoxy-substituted product with hydrogen bromide or hydrogen iodide solution at the boil.

The 3,4-dihydro compounds of Formula I wherein $R_2$ signifies alkyl, as well as the corresponding 1,2,3,4-tetrahydro compounds wherein one of $R_1$ and $R_2$ is alkyl and the other is hydrogen, possess an asymmetric carbon atom and are therefore usually obtained in the form of a racemate which can be received into its optical antipodes by methods known per se. 1,3-dialkyl-1,2,3,4-tetrahydro compounds of Formula I possess two asymmetric carbon atoms and therefore form two racemates, i.e. 4 optical isomers. The instant invention comprehends all these forms.

The tricyclic compounds of this invention are new basic materials which form acid addition salts with medicinally acceptable acids, for example, they form pharmaceutically acceptable acid addition salts which are easily crystallizable and water soluble with both organic and inorganic acids, for example, mineral acids such as hydrochloric acid, hydrobromic acid, sulfuric acid, and organic acids such as tartaric acid, malic acid, maleic acid, citric acid, methanesulfonic acid, and the like.

The above-described tricyclic bases, as well as their acid addition salts, inhibit monoamine oxidase and are useful as stimulants for the central nervous system. They can be administered in the form of conventional pharmaceutical preparations, with dosage adjusted to individual requirements. For example, they can be administered in mixture with suitable pharmaceutical organic or inorganic carrier materials adapted for enteral or parenteral application such as, for example, water, gelatin, lactose, starch, magnesium stearate, talc, vegetable oils, gums, polyalkylene glycols, Vaseline, or the like. The pharmaceutical preparations can be in conventional solid forms, for example, tablets, dragees, suppositories, capsules, or the like, or in conventional liquid forms, for example, solutions, suspensions, emulsions, or the like. If necessary, they can be sterilized or contain pharmaceutical adjuvants, such as preservatives, stabilizing agents, wetting agents, emulsifying agents, salts for the adjustment of osmotic pressure or buffers. Furthermore, if desired, they can contain other therapeutically active materials.

The following examples are illustrative but not limitative of this invention. All temperatures are stated in degrees centigrade.

*Example 1*

6.2 g. of 3-($\beta$-aminoethyl)-benzofuran was added to a mixture of 5 g. of pyridine and 5.1 g. of acetic anhydride. The reaction mixture was stirred for 2 hours during which time the temperature was not permitted to rise above 70°. It was then concentrated in vacuo, the residue poured into ice water and extracted with ether. The ether phase was washed with 2 N hydrochloric acid and water, and then dried and concentrated yielding 7 g. of the crude acetyl compound as a dark oil.

7 g. of 3-($\beta$-acetamidoethyl)-benzofuran in 65 ml. of benzene and 7.5 ml. of phosphorous oxychloride was boiled on a water bath under reflux for 2 hours. The reaction mixture was then concentrated in vacuo, carefully mixed with water and extracted with ethyl acetate. The organic solution was separated, washed with water, dried and concentrated, yielding the crude base in the form of an oil. By dissolution in acetone, and the addition of alcoholic hydrochloric acid, there was obtained upon treatment with ether, 1-methyl-3,4-dihydro-benzofuro[2,3-c]-pyridine hydrochloride as hygroscopic crystals melting at 167–169°.

The starting material, 3-($\beta$-aminoethyl)-benzofuran, was prepared as follows:

20 g. of 2,3-dihydro-3-benzofuranone, 26 g. of cyanoacetic acid and 6 g. of ammonium acetate were added to 240 ml. of xylene and maintained for 20 hours in a flask equipped with a reflux condenser and a water separator at a bath temperature of 175°. The reaction mixture was then permitted to cool, taken up in ether, washed twice with dilute sodium hydroxide solution and then with saturated sodium chloride solution. It was then dried over sodium sulfate and concentrated, yielding crude 3-cyanomethyl-benzofuran in the form of a residual dark oil. This crude product was purified by chromatography with benzene on 200 g. of silica gel.

A solution of 4 g. of 3-cyanomethyl-benzofuran in 100 ml. of absolute ether was added to a suspension of 1 g. of lithium aluminum hydride in 50 ml. of absolute ether. The reaction mixture was heated under reflux for two hours. It was then permitted to cool and hydrolyzed via the addition of 50 ml. of water. The so-formed precipitate was filtered off with suction, and the ethereal filtrate extracted with 2 N hydrochloric acid. The hydrochloric acid solution was rendered alkaline, yielding 3-($\beta$-aminoethyl)-benzofuran, which was taken up in ether and worked up in a conventional manner, yielding the product in the form of an oil. The 3-($\beta$-aminoethyl)-benzofuran hydrochloride formed therefrom melted at 185–189°; the oxalate melted at 205°.

*Example 2*

According to the method set forth in Example 1 above, 3-($\beta$-acetamidoethyl) - 6 - methoxy-benzofuran was obtained via acetylation of 2.06 g' of 3-($\beta$-aminoethyl)-6-methoxy-benzofuran in 0.9 g. of pyridine and 1.2 g. of acetic anhydride. 2.6 g. of this compound was cyclized with 2.6 g. of phosphorous oxychloride in 50 ml. of benzene under reflux, and 1-methyl-7-methoxy-3,4-dihydro-benzofuro[2,3-c]pyridine was isolated after the usual work-up. From an etheral solution it crystallized upon standing; it melted at 79–79.5°. Upon the addition of methanolic hydrochloric acid to a solution of the base in methanol, the hydrochloride was formed. It melted, after recrystallization from methanol/ether at 225–226°.

The starting material used above, i.e. 3-($\beta$-aminoethyl)-6-methoxy-benzofuran (the hydrochloride of which melts at 179–181°) was prepared by the condensation of 6-methoxy-2,3-dihydro-3-benzofuranone with cyanoacetic acid according to the method described in Example 1, and as described therein by subsequent reduction of the so-obtained 3-cyanomethyl - 6 - methoxy-benzofuran with lithium aluminum hydride.

*Example 3*

100 mg. of 1-methyl-7-methoxy-3,4-dihydro-benzofuro[2,3-c]pyridine hydrochloride was dissolved in 5 ml. of methanol and reduced at room temperature via the addition of 100 mg. of sodium borohydride and 2.5 ml. of methanol. After being permitted to stand for several hours, the reaction mixture was treated with ether and water, the ether layer separated, washed and dried. Upon the introduction of hydrogen chloride, 1-methyl-7-methoxy - 1,2,3,4 - tetrahydro-benzofuro[2,3-c]pyridine hydrochloride precipitated and was filtered off and dried, M.P. 256–257°.

*Example 4*

1 - methyl - 7 - methoxy-1,2,3,4-tetrahydro-benzofuro[2,3-c]pyridine (obtained via reduction of 100 mg. of the corresponding 3,4-dihydro compound as described in Example 3 above) was dissolved in 50 ml. of methanol. To this solution, 0.05 ml. of a 38% aqueous formaldehyde solution was added and the resulting mixture permitted to stand for 3 hours. It was then hydrogenated over 1 g. of Raney-nickel at room temperature and atmospheric pressure, the catalyst filtered off and the filtrate concentrated to dryness. The residue was dissolved in ether and hydrogen chloride introduced into the so-formed ethereal solution, yielding 1,2-dimethyl-7-methoxy - 1,2,3,4 - tetrahydro-benzofuro[2,3-c]pyridine hydrochloride, which was filtered off and dried, M.P. 223–224°.

*Example 5*

1.9 g. of 1-methyl-7-methoxy-3,4-dihydro-benzofuro[2,3-c]pyridine were treated with 14.3 ml. of a 48% aqueous hydrogen bromide solution while heating at the boil for ½ hour. The reaction mixture was concentrated in vacuo whereupon the residue crystallized upon cooling. The crystals were collected, dissolved in methanol, their methanolic solution treated with activated carbon, filtered and added with ether till crystallization of the purified base took place. There were obtained 1.2 g. of 1-methyl - 7 - hydroxy-3,4-dihydro-benzofuro[2,3-c]pyridine hydrobromide as slightly brownish crystals of M.P. 304–308° (decomposition).

*Example 6*

0.6 g. of 1-methyl-7-methoxy-3,4-dihydro-benzofuro[2,3-c]pyridine were mixed with 1 g. of palladium-black and heated at a temperature of 200° over a period of ½–¾ hour. The mixture was distilled in high vacuo at a temperature of 145–180° in order to isolate the dehydrogenation product. The distillate crystallized spontaneously and was purified via dissolution in methanol, addition of methanolic hydrochloric acid and isolated as hydrochloride upon the addition of ether. There were obtained 450 mg. of 1 - methyl-7-methoxy-benzofuro[2,3-c]pyridine hydrochloride of M.P. 260–261°.

We claim:

1. A compound selected from the group consisting of compounds of the formulae

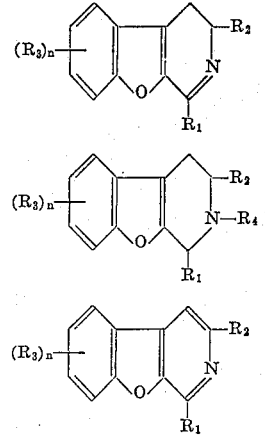

and pharmaceutically acceptable acid addition salts thereof, wherein $R_1$, $R_2$ and $R_4$ are each selected from the group consisting of hydrogen and lower alkyl, $R_3$ is selected from the group consisting of hydroxy, lower alkoxy, lower alkyl, nitro, halogen and trifluoromethyl, $n$ is a whole integer from 0 to 3.

2. 1-methyl-3,4-dihydro-benzofuro[2,3-c]pyridine.

3. 1 - methyl - 7 -methoxy - 3,4 - dihydro-benzofuro[2,3-c]pyridine.

4. 1 - methyl - 7 - methoxy - 1,2,3,4-tetrahydro-benzofuro[2,3-c]pyridine.

5. 1 - methyl - 7 - hydroxy - 3,4 - dihydro - benzofuro[2,3-c]pyridine.

6. 1-methyl-7-methoxy-benzofuro[2,3-c]pyridine.

7. 1-lower alkyl-7-lower alkoxy-3,4-dihydro-benzofuro[2,3-c]pyridine.

8. 1 - lower alkyl - 7 - lower alkoxy - 1,2,3,4 - tetrahydrobenzofuro[2,3-c]pyridine.

9. 1-lower alkyl-2-lower alkyl-7-lower alkoxy-1,2,3,4-tetrahydro-benzofuro[2,3-c]pyridine.

References Cited by the Examiner

UNITED STATES PATENTS

| | | | |
|---|---|---|---|
| 2,589,378 | 3/1952 | Henecka | 260—294.7 |
| 2,809,201 | 10/1957 | Koelsch | 260—294.7 |
| 3,070,606 | 12/1962 | Anderson | 260—346.2 |

WALTER A. MODANCE, *Primary Examiner.*

NICHOLAS S. RIZZO, R. T. BOND,
*Assistant Examiners.*